United States Patent [19]

Balmforth et al.

[11] 4,419,652
[45] Dec. 6, 1983

[54] TEMPERATURE SENSOR

[75] Inventors: Willard R. Balmforth, Wood County; David C. Weber, Lucas County; Michael L. Gibbons, Seneca County, all of Ohio

[73] Assignee: Bendix Autolite Corp., Fostoria, Ohio

[21] Appl. No.: 309,877

[22] Filed: Oct. 9, 1981

[51] Int. Cl.³ .............................................. H01C 3/04
[52] U.S. Cl. ..................................................... 338/28
[58] Field of Search .................. 338/22 R, 22 SD, 25, 338/28, 30; 374/138, 148, 183, 185, 208, 209, 144, 145; 29/612

[56] References Cited

U.S. PATENT DOCUMENTS

| 2,120,335 | 6/1938 | Lederer | 338/30 X |
| 3,845,443 | 10/1974 | Fisher | 338/308 X |
| 4,142,170 | 2/1979 | Blatter | 338/28 |
| 4,143,347 | 3/1979 | Ichida | 338/28 |
| 4,193,965 | 3/1980 | Cullingford et al. | 338/13 X |

FOREIGN PATENT DOCUMENTS 858810  5/1940  France .................................. 338/30

Primary Examiner—C. L. Albritton
Attorney, Agent, or Firm—Leo H. McCormick, Jr.; Ken C. Decker

[57] ABSTRACT

A temperature sensor (1) having a thick or thin film forming a resistance temperature sensing element (13c), a thermocouple (13a, 13b) or a resistance temperature device (13d) applied to the outer surface of one end (5) of a dielectric, cylindrical support (3) having a continuous circumferential protuberance (11) about the middle portion (9) thereof which can be engaged by a metal fixturing shell (33). Film type electrodes (15) and (17) extend upwardly along the outside of the dielectric support to terminal grooves (28) on the other end (7). A dielectric coating (29) is applied over the electrodes (15) and (17) to provide electrical isolation from the metal shell (33). A coating (29") may also be applied over the sensors (13) to reduce corrosion and abrasion and to provide electrical insulation.

6 Claims, 4 Drawing Figures

TEMPERATURE SENSOR

The invention is directed to a temperature sensor which may be used in any application in which the temperature of a solid, liquid or gas medium must be determined.

The principle problem encountered in the present state of the art of temperature sensors is the high cost of assembly due to the various component parts. It is a common practice to manufacture a temperature sensor by securing a substrate having sensing elements thereon in an assembly composed of several discrete parts. Such an assembly is taught in U.S. Pat. No. 4,193,965. It has also been the practice to extend wire leads through the center of the substrate and supporting shell. Examples of the structure are shown in U.S. Pat. Nos. 4,142,170 and 4,143,347.

DISCLOSURE OF THE INVENTION

The present invention is characterized by a temperature sensing apparatus having a film forming a resistance temperature sensing element, a thermocouple or a resistance temperatuve device (RTD) applied to the outer surface of one end of a dielectric cylindrical support. The dielectric support has a continuous protuberance about the mid region thereof which can be engaged by a conventional metal fixturing shell. Film type electrodes extend upward along the outside of the dielectric support to terminals and on the other end of the support. A dielectric coating is applied over the electrodes and on at least that portion of the support contiguous with the metal shell to provide electrical isolation therefrom. The dielectric coating may also be applied over the sensors to reduce corrosion and abrasion and to provide electrical insulation.

The dielectric substrate may be provided with grooves at one end thereof to serve as a terminal region where electrical continuity between the conductors printed on the substrate's surface and and wire leads and can be established. The protuberance about the center of the dielectric support is a mounting seat onto which a metal, threaded fixturing shell is secured by a mechanical crimp, thus simplifying the assembly of the sensor.

The advantages offered by the invention are mainly that the high cost of assembly is significantly reduced due to the minimizing of component parts, reliability of the sensor is enhanced and simplicity of construction obtained.

DETAILED DESCRIPTION OF THE INVENTION

Figure 1:
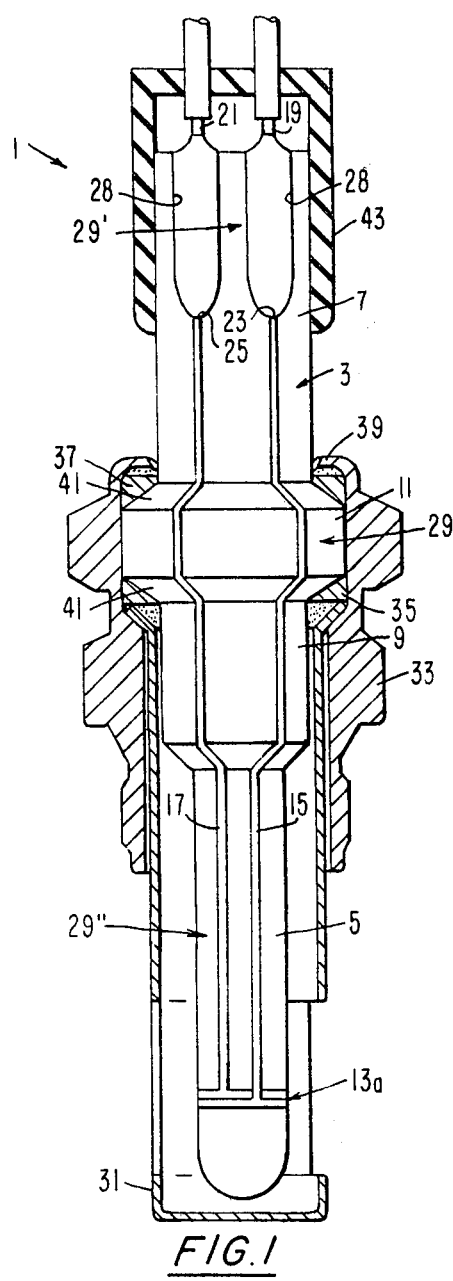
FIG. 1 is a partly sectioned view of a temperature sensing apparatus incorporating the features of the present invention.

The temperature sensor of the invention may be used in any application in which the temperature of a substance must be determined. The substance can be gas, liquid or solid. There is illustrated in FIG. 1 a temperature sensing apparatus generally indicated by the reference character 1. A generally cylindrical dielectric support 3 may be manufactured from a ceramic such as alumina, steatite or cordierite, or from high temperature organics such as teflon, polycarbonate or fiber reinforced plastics, or from a combination of ceramic and organic materials. The dielectric support can be made by turning, isostatic pressing, slip casting, injection molding or any other convenient manufacturing method. Additionally, the dielectric support can be solid, completely hollow or hollow only at the portion of the substrate on which the sensing means are applied. When the substrate is hollow, thermal mass is reduced and the response time of the sensor in adjusting to thermal changes in the environment is also reduced.

The dielectric support 3 comprises three integral sections: a first end portion or sensing region 5 which is preferably smaller in diameter than the rest of the substrate, a second end portion or terminal section 7 and a center portion 9. It is preferred that the center portion 9 include a continuous protuberance 11 disposed about the circumference thereof, the purpose of which will be hereinafter more fully explained.

It should become clear to those skilled in the art of temperature sensing devices that a wide variety of sensor means and patterns may be utilized with this invention and that the particular sensing means applied to the substrate are provided for illustrative purposes only and from which no limitations should be drawn. The sensing means 13a is associated with a pair of conductive leads 15 and 17 extending the length of the substrate 3. The conductors 15 and 17 consist of conductive metal film applied to the outer surface of the dielectric support by any of a variety of printing techniques such as thin film photo-etching, thick film transfer printing and thick film spraying. The pattern of the sensing means depends on the type of sensor being manufactured.

Figure 2:
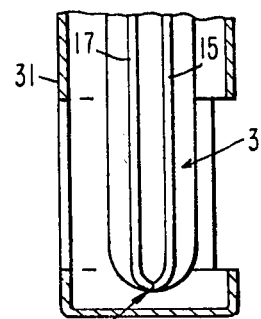
FIG. 2 is a partly sectioned view of a temperature sensing element in an apparatus according to this invention.

The sensing means 13a of the sensor embodiment illustrated in FIG. 1 is an averaging thermocouple. Positive and negative conductive leads 15 and 17 respectively, extend the length of the substrate and terminate in the sensing region 5 as two circumferential bands in electrically conductive contact with one another. The circumferential bands monitor and average the temperature of the fluid surrounding the substrate. In FIG. 2, an alternative embodiment of a thermocouple sensor is illustrated in the form of a point thermocouple sensing means 13b. The conductive leads, 15 and 17, terminate together as a point in the sensing region 5 and thus monitor the temperature of the fluid environment in contact with a single point of the substrate. Thermocouple measurement requires that the conductive leads 15 and 17 have a known electromotive force (EMF) junction output where contact is made in the sensing region to form a sensing means 13a or 13b. Moreover, the EMF output should be close to zero between the further lead wires 19 and 21 and the conductive leads 15 and 17 where electrical contact is established therebetween as at terminals 23 and 25 respectively.

Figure 3:
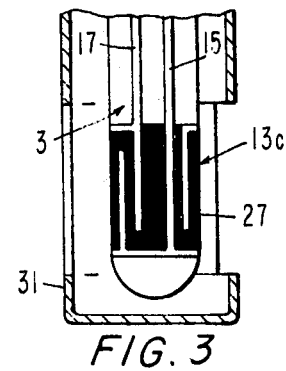
FIG. 3 is a partly sectioned view of a temperature sensing element of an alternative embodiment of an apparatus according to this invention.

There is illustrated in FIG. 3 a grid pattern formed by two conductive leads 15 and 17 manufactured from the same material and arranged in a noncontiguous relationship. An over-or-under layer of a temperature sensitive resistor 27 forms a resistance temperature sensor 13c. The resistor 27 is manufactured from a material having a switch-like action at a set temperature such as positive temperature coefficient material which drastically changes its impedance rating at a predetermined high temperature. A semiconductor may also be used in this configuration instead of resistor 27.

Figure 4:
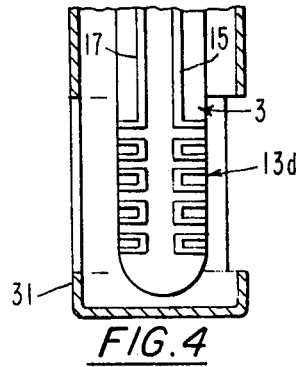
FIG. 4 is a partly sectioned view of a temperature sensing element of another alternative embodiment in an apparatus to this invention.

A final illustrative embodiment is shown in FIG. 4 where a serpentine conductor with a high resistance in the sensing region 13d forms a resistance temperature device (RTD), the resistance of which varies proportionally to temperature. The conductor leads 15 and 17 can be made of the same material as the serpentine pattern or from a material having a lower resistance. A platinum serpentine 13d with low resistance silver leads 15 and 17 is one possible configuration of an averaging resistance temperature device.

Returning now to FIG. 1, the assembly of temperature sensor 1 will be fully explained. After the sensing means and conductors 15 and 17 are applied to the surface of the substrate, a dielectric coating 29 is applied to the surface of the cylindrical dielectric support 3. The dielectric coating 29 encases at least the conductors 15 and 17 at the center portion 9 of the support 3. An optional dielectric coating 29' can be applied to the second end portion 7 in order to improve the electrical isolation of the conductor leads 15 and 17 between the terminal grooves 28. Moreover a dielectric coating, as at 29'' may be applied to the first end portion 5 over the sensing region to improve the durability of the sensing materials in a moving abrasive or corrosive fluid medium or to improve operation in an electrically conductive environment. When the dielectric coating is applied to the substrate 3, care must be exercised to ensure that the terminal grooves 28 in the surface of the second end portion 7 remain free of the dielectric material 29'. The terminal grooves 28 are preferably coated with a thick film conductor of good adherance which is in contact with conductors 15 and 17.

After the dielectric coating is applied to the desired portions of the substrate 3 and fired, the sensor is ready for final assembly. Typically, a cylindrical shield 31 having holes, vents or louvers therein to obtain good thermal contact between the medium and the sensing region 5, is inserted into the bore of a threaded fixture shell 33. The shield 31 and shell 33 protect the dielectric support and conductors from abrasion, corrosion and shock. One or more deformable cushioning washers 37 are respectively inserted into the bore of shell 33. The deformable cushioning washers 35 and 37 may be talc, soft metal or the like. The top edge of the shell 33 as at 39, is crimped to mechanically retain the dielectric support 3 within the shell and shield. Two lead wires 19 and 21 are soldered to the thick film conductors of terminal grooves 28. While it is advantageous to solder or braze the connections since the material and fabrication cost is low, other methods of connection may also be used. These methods would include spring contact, gluing and threaded terminals, depending, of course, on the use temperature of the sensor. The complete sensor apparatus 1 is insensitive to axis rotational orientation.

As was previously indicated, the center portion 9 of the dielectric support 3 has a continuous integral protuberance 11 about its circumference. The protuberance may have beveled edges 41 which serve as seats for the cushioning washers 35 and 37 and simplify the application of the conductors 15 and 17. A protective cover 43 might typically consist of a silicone boot or a conformal coat. The dielectric coating 29 which encases at least the conductors 15 and 17 as they traverse the center portion 9 of the dielectric support permits the simplified manufacturing procedure described above by electrically insulating the printed film conductors from the metal fixturing shield.

Having described the invention, what is claimed is:

1. In a temperature sensing apparatus having a generally cylindrical dielectric support with a first end surface portion, a center surface portion and a second end surface portion, temperature sensing film means on said first end surface portion, and a threaded fixturing shell encapsulating at least the center portion of said support, the improvement comprising:
   a continuous integral protuberance extending from said center surface portion;
   an electrically conductive film means extending from said temperature sensing means at said first end surface portion, along said protuberance and terminating at said second end surface portion; and
   a dielectric coating encasing at least said conductive film means at said protuberance, said protuberance providing a mounting seat for the threaded fixturing shell and said dielectric coating providing electrical isolation between said conductive film means and said fixturing shell to assure that a signal generated by said sensing film means is transmitted to said second end surface portion without interruption.

2. The temperature sensing apparatus of claim 1 wherein the second end portion of the dielectric support includes in the surface thereof one terminal groove for each electrically conductive film means, said groove having a thick film conductor disposed therein to provide good adherance and contact with said conductive film means.

3. The temperature sensing apparatus of claims 1 or 3 whereby the electrically conductive film means terminating at the second end portion are in electrical communication with further electrically conductive means and the dielectric coating encases both the center surface portion and the second end surface portion of the dielectric support.

4. The temperature sensing apparatus of claim 3 whereby the dielectric coating also encases the temperature sensing film means adjacent the first end surface portion of the dielectric support.

5. The temperature sensing apparatus of claim 1 wherein the first end portion of the generally cylindrical dielectric support is of a lesser diameter than center section of said support and the apparatus includes a protective shield mounted over said first end portion, said protective shield being supported by the threaded fixturing shell.

6. The temperature sensing apparatus of claim 1 wherein the dielectric support is hollow in at least the first end portion thereof to reduce thermal mass.

* * * * *